UNITED STATES PATENT OFFICE.

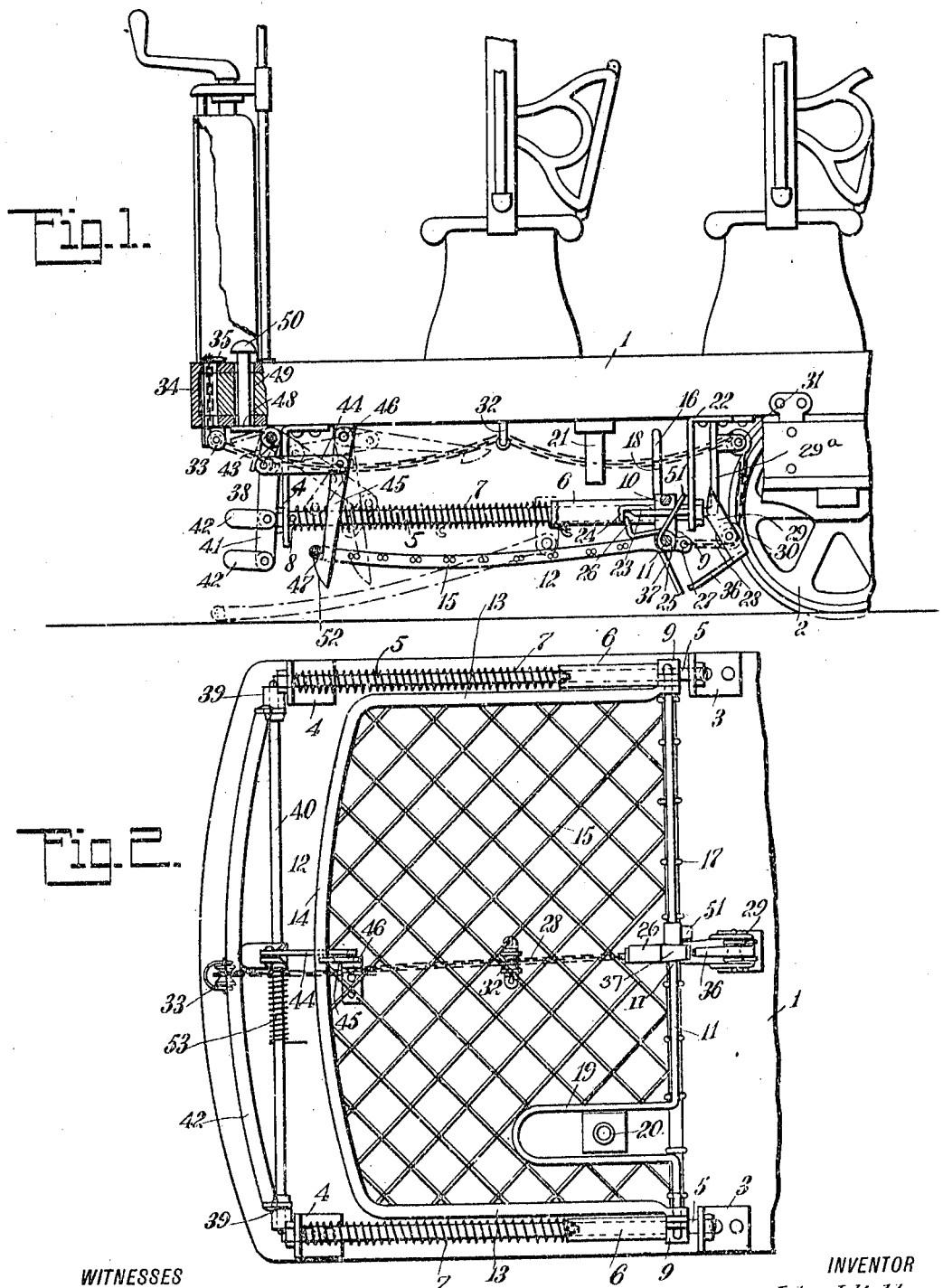

JOHN J. KELLY, OF NEW YORK, N. Y.

CAR-FENDER.

954,303.  Specification of Letters Patent.  Patented Apr. 5, 1910.

Application filed October 7, 1909. Serial No. 521,458.

*To all whom it may concern:*

Be it known that I, JOHN J. KELLY, a citizen of the United States, and a resident of the city of New York, borough of Manhattan, in the county and State of New York, have invented a new and Improved Car-Fender, of which the following is a full, clear, and exact description.

This invention relates to car fenders, and especially to such as are attached to the forward ends of trolley cars or street cars, for the purpose of preventing accidents.

The object of the invention is to produce a fender of simple construction which will normally be held in inoperative position, but which can be quickly released so as to become operative. When released in this manner the cradle of the fender drops to an operative position and is projected forwardly with its forward edge near the ground line. The fender is arranged so that it can be tripped automatically by a body lying on the ground before the car, or it may be released directly by the motorman.

The invention consists in the construction and combination of parts to be more fully described hereinafter and particularly set forth in the claims.

Reference is to be had to the accompanying drawings forming a part of this specification, in which similar characters of reference indicate corresponding parts in both the figures.

Figure 1 is a side elevation and partial section showing the forward end of the car to which the invention is applied; and Fig. 2 is a bottom plan of the forward end of the car and the fender.

Referring more particularly to the parts, 1 represents the car body or floor, to the under side of which the fender is applied. In applying my fender, at each side of the car body, just forward of the forward wheels 2, I attach brackets 3 which extend downwardly. At the forward end of the body, and in alinement with these brackets 3, I provide similar brackets 4, and between these brackets, guide bars 5 are secured, as shown, in a horizontal position. On these guide bars 5, sleeves 6 are mounted to slide, and to the forward ends of these sleeves, coil springs 7 are attached, the forward ends of the said springs being secured at 8 to the bars near the brackets 4. These springs tend to pull the sleeves forwardly. The rear ends of the sleeves 6 are enlarged so as to form brackets 9 which extend downwardly, as shown, and between these brackets a stop rod 10 passes transversely of the car. Parallel with this stop rod there is provided a hinge rod 11 which is disposed just under the stop rod, as indicated in Fig. 1. Its ends are rotatable in the brackets 9.

On the hinge rod 11, a cradle 12 is mounted so as to swing downwardly toward the ground. This cradle is formed of a frame having side bars 13 which are rigidly secured to the bar 11, as will be readily understood, and these arms 13 are connected by an integral front bar or bow 14. The body of the cradle is formed by a net 15 of coarse wire mesh or similar material.

On the upper side of the fender at the rear of the cradle, a transverse guard 16 is formed, which is composed of uprights 17 connected by a transverse bar 18. This guard projects up toward the floor of the car and prevents any possibility of a body passing over the rear edge of the cradle.

The pivot bar or hinge bar 11 near one side of the car is provided with a forwardly extending offset or loop 19, which is provided so as to enable a sand tube 20 to pass downwardly in the manner indicated in Fig. 2, said sand tube being secured to a fitting 21 attached to the under side of the car floor, as indicated in Fig. 1. The tube 20 is not shown in Fig. 1, so as to prevent its confusing the construction of the fender.

On the central axis of the car, on the under side of the body, a bracket 22 is attached, and this bracket carries a forwardly projecting tongue 23. The end of this tongue is bent downwardly and inclines slightly toward the rear so as to form a detent tooth or catch 24. Near this point on the hinge bar or pivot bar 11 a trigger 25 is attached. This trigger is formed of a spring plate which is bent around the hinge bar, as shown, the forward extension of this plate being formed as an upwardly disposed finger or dog 26 which is adapted to engage the catch 24 so as to hold the cradle in a contracted or inoperative position, as shown in Fig. 1. The trigger 25 has a rearwardly disposed ear 27, and to this ear there is attached a chain 28 which extends rearwardly through a guide bracket 29 which is attached in a central position to a part 29ª depending from the body just to the rear of the trigger, as indicated. This guide bracket is provided with a roller 30 around which the chain 28 passes. From this point the chain passes upwardly to a similar bracket 31, and from this point it passes forwardly and over a guide pulley 32 fastened under the car floor. From this point the chain passes forwardly around another guide pulley 33, whence it passes upwardly through an opening 34 in the front end of the car platform, and to the upper side of the platform; at this point a ring 35 lies, which ring is attached to the chain, as indicated. By means of the chain the cradle of the fender may be pulled toward the rear so as to set the fender, as will be described hereinafter. The bracket 29 inclines rearwardly, as shown, and its lower end is provided with a forwardly and downwardly inclined tongue 36.

Rigidly attached to the hinge bar 11, there is provided a dog 37 which inclines downwardly and rearwardly in the normal position of the fender, as shown. When the cradle is pulled rearwardly by the chain as described, the finger 26 will move to the rear of the catch 24, and as this takes place, the dog 37 will strike the forward end of the tongue 36. A further pull upon the chain will raise the cradle so as to engage the finger 26 with the catch 24 and hold the cradle in its set or inoperative position. However, the fender will only stay in this position while tension is maintained in the chain, for the weight of the cradle, if it were not for the chain, will immediately cause the cradle to fall and release itself from the catch 24.

In order to hold the cradle normally in an elevated position, as indicated in Fig. 1, I provide trip mechanism 38; this trip mechanism comprises brackets 39 which support a transverse pivot bar 40. Near the ends of this pivot bar, arms 41 are attached which extend downwardly, and near the lower ends of these arms, guard bows 42 are attached, and these bows extend forwardly, as shown. Near the middle point of the pivot bar 40, an arm 43 is rigidly attached, and to this arm there is attached a link 44 which extends rearwardly. To the rear end of this link, an arm 45 is attached, and the upper end of this arm is pivotally mounted at 46. The lower end of this arm is formed with a catch 47 which is adapted to engage the under side of the cradle bar 14, as indicated. To the hinge bar 40, at a suitable point, a trip plate 48 is rigidly attached, and this plate extends in a horizontal position under an opening 49 in the platform. In this opening there is mounted a depressible foot plunger 50, the upper end of which is formed into a head above the upper surface of the car platform. When this plunger is depressed by the motorman's foot the hinge bar 40 will be rotated and the catch lever 45 will be moved rearwardly so as to disengage the front end of the cradle. The cradle will then fall and as the cradle falls, it releases itself at the rear by reason of the disengagement of the dog 26 from the catch 24; the springs will then operate to advance the cradle toward the position in which it is indicated in dotted lines in Fig. 1. It should also be understood that if a body strikes the guard bows 42, the trip arms 41 will be swung rearwardly toward the position in which they are indicated in dotted lines in Fig. 1. In this way the catch 45 may also be released so as to permit the cradle to fall, as suggested.

In order to limit the drop or downward swinging movement of the fender, near its middle point the hinge bar 11 is provided with a rigid stop tongue 51. This tongue is normally disposed slightly toward the rear of the stop bar 10, but when the cradle drops, as suggested, it will strike the stop bar at about the time the forward edge of the cradle strikes the ground. This stop tongue is of no special importance as affecting the operation of the fender under normal conditions, but is intended principally to hold the fender up in case the car is passing over a pit in the car shed while the fender is in its sprung or released position.

Referring again to the arm 45, it should be noted that its lower end is provided with an inclined edge 52, and this edge is adapted to be struck by the bow 14 of the cradle as the cradle swings upwardly. On the hinge bar 40 a coil spring 53 is provided which tends to rotate the hinge rod in a forward direction so that when the cradle is raised in this manner the catch 47 automatically engages it.

Special attention is called to the fact that in the operation of the fender, the cradle cannot advance until it has swung down or dropped, for the reason that the catch 24 will prevent the forward advance of the cradle until the dog 26 becomes disengaged from it.

Having thus described my invention, I claim as new and desire to secure by Letters Patent,—

1. A car fender, comprising a cradle adapted to drop at its forward edge, means for guiding said cradle in a front and rear direction, means tending to advance said cradle, latch mechanism normally preventing the advance of said cradle and adapted to be released by the dropping of said cradle, and means for normally holding said cradle in an elevated position.

2. In a car fender, in combination, a cradle adapted to swing down at its forward edge, means for guiding said cradle to slide in a front and rear direction, a fixed catch mounted near the rear edge of said cradle, a dog carried by said cradle adapted to raise said catch when said cradle is in an elevated position, means tending to advance said cradle, and means for normally holding the forward edge of said cradle in an elevated position.

3. In a car fender, in combination, guide bars disposed at the sides of the car, sleeves mounted to slide on said guide bars, a cradle having its rear edge pivotally mounted between said sleeves and adapted to swing downwardly at its forward edge, means for normally holding the forward edge of said cradle in an elevated position, springs tending to advance said sleeves, and a catch at the rear edge of said cradle normally holding the same in a withdrawn position and released by the dropping movement of said cradle.

4. In a car fender, in combination, a pair of guide sleeves, means for guiding said sleeves in a front and rear direction, a cradle having a hinge connection with said sleeves at the rear edge of said cradle, a fixed catch, means for drawing said cradle rearwardly, a dog carried by said cradle adapted to engage said catch when said cradle is raised, means for raising said cradle automatically when drawn rearwardly so as to engage said catch, means tending to advance said sleeves normally detained by said catch, and means for normally holding the forward edge of said cradle in an elevated position.

5. In a car fender, in combination, a pair of guide sleeves, means for guiding said sleeves in a front and rear direction of the car, a cradle having a hinge connection at its rear edge between said sleeves, a fixed catch adjacent to the rear edge of said cradle, a fixed bracket also adjacent to the rear edge of said cradle, means for drawing said cradle rearwardly, a member carried by said cradle adapted to engage said bracket when said cradle is drawn rearwardly and affording means for swinging the said cradle upwardly, a dog carried by said cradle adapted to engage said catch, means for normally advancing said sleeves to advance said cradle, and means for normally holding the forward edge of said cradle in an elevated position.

6. In a car fender in combination, a pair of guide sleeves, means for guiding said sleeves to slide in a front and rear direction, a cradle having its rear edge hinged between said sleeves, means for drawing said cradle rearwardly, automatic means for swinging said cradle upwardly when drawn rearwardly, a dog carried near the rear edge of said cradle, a catch adapted to engage said dog when raised for locking said cradle against forward movement, means tending to advance said cradle, means at the forward edge of said cradle for normally holding the same in an elevated position, and a trip frame connected with said means for releasing said cradle.

7. In a car fender, in combination, a pair of guide bars, sleeves sliding on said guide bars, a cradle having a hinge connection at its rear edge near said sleeves and adapted to swing downwardly, a catch normally holding said sleeves in their rearmost position, means tending to advance said sleeves, a catch at the forward edge of said cradle for normally holding the same in an elevated position, and means for releasing said catch.

In testimony whereof I have signed my name to this specification in the presence of two subscribing witnesses.

JOHN J. KELLY.

Witnesses:
F. D. AMMEN,
PHILIP D. ROLLHAUS.